(12) United States Patent
Aitken et al.

(10) Patent No.: US 6,577,971 B2
(45) Date of Patent: Jun. 10, 2003

(54) SYSTEM AND METHOD FOR EVALUATING CRAFTSMANSHIP

(75) Inventors: Thomas J. Aitken, Holland, MI (US); Annette H. Holbrook, Northville, MI (US); Neal J. Kupisz, Tecumseh, MI (US); Richard S. Chung, Novi, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/922,949

(22) Filed: Aug. 6, 2001

(65) Prior Publication Data

US 2003/0033100 A1 Feb. 13, 2003

(51) Int. Cl.[7] .............................................. G06F 19/00
(52) U.S. Cl. .......................................... 702/81; 702/34
(58) Field of Search ................ 702/81, 5, 34; 364/552; 705/29; 307/10; 280/707; 73/587; 250/226; 356/364; 701/29; 340/483

(56) References Cited

U.S. PATENT DOCUMENTS 5,706,213 A * 1/1998 Takakura et al. ........... 346/552
6,338,023 B1 * 1/2002 Bourgeois et al. ............. 702/5
6,338,045 B1 * 1/2002 Pappas ........................ 705/29

OTHER PUBLICATIONS

"Classroom Teaching Outline & Presentation Materials, Thomas J. Aitken, 1996.".

* cited by examiner

Primary Examiner—Bryan Bui
Assistant Examiner—Tung S Lau
(74) Attorney, Agent, or Firm—Foley & Lardner

(57) ABSTRACT

A system and method for evaluating craftsmanship is disclosed. A system for evaluating the craftsmanship of an article of manufacture may include a list of components to be evaluated, a list of attributes by which the components are to be evaluated, and a report providing a quantitative score of each component according to each attribute. The attributes include visual attributes, tactile attributes, functional attributes, and psychological attributes. A method of evaluating the craftsmanship of an article, including a plurality of components or assemblies, may include a set of steps. The steps may include evaluating visual attributes of at least one component or assembly, evaluating tactile attributes of at least one component or assembly, evaluating functional attributes of at least one component or assembly, and evaluating psychological attributes of at least one component or assembly. The method may also include the step of providing a report of quantitative results or ratings. The step of evaluating an attribute may include perceiving the attribute and recording an observation about the attribute.

51 Claims, 14 Drawing Sheets

CRAFTSMANSHIP OVERVIEW

LOOSE
FORM STABILITY
LUMPY BAGGY FORM

TAUT
DETAIL DESIGN
CAREFULLY HELD FORM
MATCHES BACK

WORKSHEET/REPORT

FIGURE 6
WORKSHEET/REPORT

Component: Instrument Panel design = d
material = m
execution = e

● = Excellent
v = Very good
g = Good
a = Acceptable, Avg.
m = Marginal

Rating: 3.4
13.0

100 – nasty, bothersome
75 – quite noticeable
50 – noticeable
25 – bad but not too important
10 – not very noticeable
Demerits: 26

| Attributes | Flag | | Avg. | comments | recommendations |
|---|---|---|---|---|---|
| Visual Impressions: | | | | | |
| Fits: | | # | 385 | | |
| Gaps | | a | 290 | | |
| Component alignments | red | a | 40 | Upper to lower varies by several mills, shows some edges and assembly gaps. | Speck door rigidity and hinge design or design in a locator for closed position. |
| Seams | | a | 50 | Vent bottom edge not lining up with lower panels - inconsistent. | Design in a lower edge. |
| Weaves | | | | | |
| Holes and fasteners | | a | 20 | Screws quite visible under brow, one in end cap, glove box open reveals seams. | Recess attachments under brow. |
| See through | red | a | 50 | Vents reveal glossy foam materials inside, defogger visible from drivers position. | Angle openings away from sight lines. Specify Mat black materials inside. |
| Finishes: | | | | | |
| Color harmony | | a | 30 | Panel over column is darker, the rest match wall. | Spec same material as the others, control color. |
| Grain harmony | | g | 30 | The panel over the column is the one exception. | Inspect tools and control grain strategy/one grainer? |
| Cover good harmony | | | | | |
| Gloss | red | a | 50 | Lower panels slightly higher than uppers, vent veins higher than bezel | Control panel grains and gloss. One supplier? One material? |
| Parting lines | | v | | None visible on show surface, some noticeable in gaps between components. | Close gaps. |
| Theme Design: | | | | | |
| Shape vocabulary | | g | | Radiused rectangles are consistent except for center stack vents. | Unify all shapes in design/signify theme formula to learn. |
| Forms and surfaces | | g | 20 | Chamfer on lower not used anywhere else, magnifies gloss difference. | Make the same as above wood applique. |
| Lines and breakups | | a | | Wood is nice. Glove box cut could match vents. | Design coordination of glove box, vents and bag cover. |
| Detail design | green | v | | Vent veins match, extra joint in upper trays is a plus, cluster is simple. | |
| Detail placement | | g | | | |
| Other Sensory Impressions | | ## | 70 | | |
| Tactile feel: | | | 6.0 | | |
| Soft/hard (surface) | | g | | | |
| Topography/texture | | g | | | |
| Temperature | | a | | Wood is believeable. | |
| Compression | | a | | Nice soft upper, knee bolsters are hard. | |
| Auditory: | | | | | |
| BSR | | a | 20 | Glove box door rattles some and squeaks. | Reduce hollow design, mat finish back sides, specify latch for no noise, grease ingress or design non squeak materials. |
| Hollow resonance | red | a | 50 | Glove box door is hollow to touch as well as lower adjacent trim. | Rubber additives in materials, deadener behind. |
| Ergonomics: | | ## | 25 | | |
| Reach | | v | 9.0 | | |
| Actuation Effort | green | g | | Glove box handle offset toward driver. | |
| Sightline/readability | | g | | | |
| Labels and badges | | v | | | |
| Mechanism action (sound/feel) | green | a | | Logo clean and honest. | |
| Vibration feedback | | a | 25 | Vent slides slightly raspy. Glove box door latch chatters, panel over column and vents flex when touched, not secured optimally. | Use rigid material with different material slide. Flexing-attachment schemes that prevent edge deflection when touched. |
| Interface (Occupants/components) | | g | | | |
| Travel/Swing | green | v | | Glove box doesn't hit knees. | Locate hinge point so swing is not in occupant zone/viscous damp for slow open. |
| Capacity for use | | g | | Glove box is small but adequate, upper trays are useful. | |
| Psychological Impressions: | | ## | 0 | | |
| Material Quality | | | 8.0 | | |
| Authenticity | | g | | Wood seems good, some plastic components show edges and do not match. | Control edges and color, grain and gloss matches. |
| Ability to last | | g | | | |
| Tech. Use (material/content) | | a | | Wood is convincing, plastic component assemblies and matches need upgrade. | Careful selection and design for materials and assembly. |
| Design Continuity | | | | | |
| Within this zone | | v | | Door: A Pillar interface is choppy. | Design for fewer breaks in line and surface. Control dimensions for position. |
| This area to others | | g | | | |
| Interior to exterior | | a | | Weak panel attachments bring down a strong impression. | Review attachment placements for stability. |
| Robustness | | | | | |
| Overall impression | | a | | Good bold impression not quite supported by assembly methods issues. | |

FIGURE 7
WORKSHEET/REPORT

| Vehicle = 56 Color: Ext/ ___ Int/ ___ Price: ___ By 58 Date 60 | The numbers translate as follows: 5=Excellent, 4=Very Good, 3.5=Good, 3=Acceptable, Avgerage, 2.5=Marginal, 2=Undesirable, 1=Failure |
|---|---|

| | | | | | | |
|---|---|---|---|---|---|---|
| Total Interior- avg= Attribute Averages | 4.5 | 2435.0 Visual 4.6 | of possible 3216.0 Tactile 4.5 | Functional 4.3 | Total Demerits = Psychological | 630 4.4 |
| Zone 'A' Totals- avg= Attribute Averages | 4.5 | 1123.0 Visual 4.6 | of possible 1482.0 Tactile 4.6 | Functional 4.0 | Total Demerits = Psychological | 140 4.6 |
| Instrument Panel avg.= | 4.3 | 145.0 Visual 4.3 | of possible 204.0 Other Senses 4.5 | Functional 3.9 | Demerits = Psychological | 40 4.4 |
| Intersection Instrument Panel-Door | 4.5 | 94.0 Visual 4.3 | of possible 126.0 Other Senses 4.7 | Functional 5.0 | Demerits = Psychological | 10 4.6 |
| Wheel and Schroud avg.= | 4.4 | 137.5 Visual 4.3 | of possible 186.0 Other Senses 4.7 | Functional 4.1 | Demerits = Psychological | 0 4.9 |
| Center stack avg.= | 4.5 | 135.5 Visual 4.7 | of possible 180.0 Other Senses 4.8 | Functional 4.2 | Demerits = Psychological | 20 4.4 |
| Front Door | 4.8 | 168.5 Visual 4.9 | of possible 210.0 Other Senses 5.0 | Functional 4.8 | Demerits = Psychological | 10 4.6 |
| Center console | 4.4 | 146.0 Visual 4.8 | of possible 198.0 Other Senses 3.9 | Functional 4.4 | Demerits = Psychological | 30 4.2 |
| First row seats | 4.7 | 179.0 Visual 4.7 | of possible 228.0 Other Senses 4.7 | Functional 4.8 | Demerits = Psychological | 10 4.8 |
| Entry | 4.7 | 117.5 Visual 4.8 | of possible 150.0 Other Senses 4.5 | Functional 4.7 | Demerits = Psychological | 20 4.6 |
| Overall interior | 5.0 | 170.0 Visual 4.8 | of possible 204.0 Other Senses 6.7 | Functional 5.0 | Psychological | 4.8 |
| Zone 'B' Totals- avg= Attribute Averages | 4.5 | 1142.0 Visual 4.6 | of possible 1530.0 Other Senses 4.4 | Functional 4.5 | Total Demerits = Psychological | 490 4.3 |
| Overhead system | 4.1 | 142.5 Visual 4.3 | of possible 210.0 Other Senses 3.9 | Functional 4.1 | Demerits = Psychological | 220 3.9 |
| Second row seats | 4.6 | 179.5 Visual 4.5 | of possible 234.0 Other Senses 4.7 | Functional 4.8 | Demerits = Psychological | 55 4.6 |
| Rear doors | 4.8 | 169.0 Visual 4.8 | of possible 210.0 Other Senses 5.0 | Functional 4.9 | Demerits = Psychological | 10 4.6 |
| Upper Trim | 4.3 | 133.0 Visual 4.5 | of possible 186.0 Other Senses 3.8 | Functional 4.4 | Demerits = Psychological | 20 4.2 |
| Lower Trim | 4.8 | 143.5 Visual 4.6 | of possible 180.0 Other Senses 4.8 | Functional 5.0 | Demerits = Psychological | 20 4.9 |
| Package tray | 4.1 | 114.5 Visual 4.3 | of possible 168.0 Other Senses 3.9 | Functional 4.0 | Demerits = Psychological | 75 3.9 |
| Cargo | 4.5 | 142.5 Visual 4.8 | of possible 192.0 Other Senses 4.5 | Functional 4.6 | Demerits = Psychological | 70 3.8 |
| Second entry | 4.7 | 117.5 Visual 4.8 | of possible 150.0 Other Senses 4.5 | Functional 4.7 | Demerits = Psychological | 20 4.6 |

FIGURE 8

REPORT

| Vehicle: | | | Attribute Averages: | | | |
|---|---|---|---|---|---|---|
| | Rating: | Demerits: | Visual: | Other Senses: | Functional: | Psychological: |
| Vehicle Totals: | 3.7 | 1716 | 3.7 | 3.7 | 3.5 | 3.7 |

| | Rating: | Demerits: | Visual: | Other Senses: | Functional: | Psychological: |
|---|---|---|---|---|---|---|
| Zone 'A' Totals: | 3.7 | 631 | 3.7 | 3.8 | 3.7 | 3.8 |
| Overall Interior | 3.8 | 0 | 3.8 | 3.8 | 3.8 | 4 |
| Instrument Panel | 3.6 | 171 | 3.5 | 3.9 | 3.6 | 3.7 |
| Intersection IP-Door | 3.6 | 40 | 3.6 | 0 | 0 | 3.8 |
| Wheel & Shroud | 3.8 | 50 | 3.7 | 3.8 | 3.8 | 3.9 |
| Center Stack | 3.7 | 110 | 3.6 | 3.8 | 3.6 | 3.7 |
| Front Door | 3.6 | 150 | 3.7 | 3.7 | 3.6 | 3.6 |
| Center Console | 3.8 | 70 | 3.9 | 3.7 | 3.7 | 3.9 |
| First Row Seats | 3.8 | 20 | 3.8 | 3.7 | 3.8 | 3.9 |
| First Entry (Driver) | 3.8 | 20 | 3.9 | 3.8 | 3.5 | 3.7 |

| | Rating: | Demerits: | Visual: | Other Senses: | Functional: | Psychological: |
|---|---|---|---|---|---|---|
| Zone 'B' Totals: | 3.6 | 1085 | 3.7 | 3.6 | 3.3 | 3.5 |
| Over Head System | 3.6 | 100 | 3.7 | 3.5 | 3.4 | 3.6 |

FIGURE 9
REPORT

VEHICLE A

Assessment Date: _____

Exterior Color: _____
Interior Color: _____
Estimated Price: $ _____

Add to Comparison Basket

|  | Rating: | Demerits: | Attribute Averages: | | |
|---|---|---|---|---|---|
|  |  |  | Visual: | Other Senses: | Functional: | Psychological: |
| Vehicle Totals: | 3.8 | 1367 | 3.9 | 3.9 | 3.9 | 3.7 |
| Zone 'A' Totals: | 3.8 | 920 | 3.7 | 4 | 3.9 | 3.6 |
| Zone 'B' Totals: | 4.0 | 416 | 4.1 | 3.9 | 3.9 | 3.8 |
| Zone 'C' Totals: | 3.6 | 31 | 3.5 | 3.8 | 3.7 | 3.5 |

Vehicle Reviews:

Test Title – Only a Test:
A – First Row Seats
CONTINUE

New Version:
A – Intersection IP - Door
CONTINUE

View complete Vehicle Assessment Summary

View Worksheets

| Zone 'A' Worksheets | Zone 'B' Worksheets | Zone 'C' Worksheets |
|---|---|---|
| - Overall Interior | - Over Head System | - Floor System |
| - Instrument Panel | - Second Row Seats | - Third Row Seating |
| - Intersection IP-Door | - Rear Doors |  |
| - Wheel and Shroud | - Upper Trim |  |
| - Center Stack | - Lower Trim |  |
| - Front Door | - Package Tray |  |
| - Center Console | - Cargo |  |

View Vehicle Photos

Main Component Photos
CONTINUE

FIGURE 10

REPORT

Vehicle-to-Vehicle: Components Comparison Report

Component: Instrument Panel

| | |
|---|---|
| e | Excellent | 5.0 |
| v | Very Good | 4.0 |
| g | Good | 3.5 |
| a | Average | 3.0 |
| m | Marginal | 2.5 |
| u | Undesirable | 2.0 |
| f | Failure | 1.0 |

| | 1 Vehicle A | 2 Vehicle B | 3 Vehicle C | 4 Vehicle D | 5 Vehicle E | |
|---|---|---|---|---|---|---|
| Attributes: | | | | | | |
| Visual impressions: | | | | | | |
| Fits: | | | | | | ³ Generally the molded parts fit together marginally, sometimes flush, sometimes stepped, sometimes a gap. |
| Gaps | v | m | m | m | g | ¹ Mostly very tight fits with little variance. ² (a) Glove box to Panel is not flush, vent bezels wobble. (b) Air bag not parallel to black trim and varies side to side. ³ Inconsistent in size and edge radii knee bolster at wheel not secured. ⁴ Most seams are tight yet pass side air bag and glove box door have inconsistent gap. ⁵ Most are consistent. Vent bezels and glove box door are consistent and tight but: (a) Upper to center intersections have wobbly gaps; (b) Vent barrels wobble slightly; (c) Side to side door intersection varies. |
| Component Alignments | v | m | m | a | g | ¹ Only end plate on instrument panel shows any noticeable misalignment, very minor. ² (a) Most surfaces and edges wobble creating a sloppy design. (b) Vents to side defoggers sit askew. (c) Glove box door not a flush fit. ³ Stack face plate and knee bolster lower do not seat well, edges are all different. |

FIGURE 11
WORKSHEET/REPORT

CRAFTSMANSHIP ATTRIBUTES

| Sensorial: | | Functional: |
|---|---|---|
| Visual: | Tactile: | Ergonomics |
| Fit and Alignment | Softness/Hardness | Mechanisms |
| Lines and Breakups | Topography and Texture | Capacity/Functional Use |
| Detail Execution | Vibration Feedback | Packaging/Intrusion |
| Color, Grain and Gloss | Temperature | Psychological: |
| Shape Vocabulary | | Theme Design |
| Forms and Surfaces | | Robustness |
| Auditory: | Olfactory: | Perceived Material Quality |
| BSR (Buzz/Squeak/Rattle) | Outgassing Odor | Surprise and Delight |
| Tone/Pitch/Resonance | Aroma | Annoyances |
| Function Feedback | | |
| Character Design | | |

FIGURE 14

SYSTEM AND METHOD FOR EVALUATING CRAFTSMANSHIP

FIELD OF THE INVENTION

The present invention relates generally to the field of evaluating the craftsmanship of an article. The present invention also relates to the field of evaluating the attributes of components that comprise the article.

BACKGROUND OF THE INVENTION

It is known to provide for evaluations of the quality of articles of manufacture. For example, it is well known for particular commercial entities to conduct rather exhaustive evaluations of a wide variety of articles allowing comparison by customers and others for such articles. It is further known to evaluate the quality or craftsmanship of articles of manufacture using consumer surveys, opinion polls, grading questionnaires or performance test results. However, in the evaluation of quality and craftsmanship, it is difficult to identify with specificity the particular attributes to give generally the "holistic" feel of quality to a user or customer of the article. Moreover, such known methods for evaluating the quality of articles often fail to identify a sufficient number of attributes to provide a comprehensive evaluation of the quality as well as craftsman of the article. Such known methods for evaluating the quality of articles also typically do not provide detailed information in a standardized format for allowing comparison between vehicles and types of vehicles to comprehensively evaluate craftsmanship in the design, selection, construction and assembly of components or articles that comprise the vehicle.

Accordingly, it would be advantageous to provide for a system and method of evaluating the craftsmanship of an article of manufacture that provides a more objective identification and rating of the attributes generally considered or identified as comprising quality and craftsmanship of the article of manufacture. It would also be advantageous to provide for a system and method for evaluating the craftsmanship of an article that can be used by customers, suppliers, manufacturers, designers, engineers, competitors, and a wide variety of other persons. It would also be advantageous to provide for a system and method of evaluating the craftsmanship of an article that allows technicians or other persons performing the evaluation to be directed to perceive particular categories, components, assemblies or elements of the article. It would further be advantageous to provide for a system and method of evaluating the craftsmanship of an article that provides a listing of attributes that breaks the otherwise subjective measure of quality and craftsmanship into essentially objective areas which can be perceived and evaluated. It would further be advantageous to provide for a system and method of evaluating craftsmanship that allows the assignment of ratings or "grades" according to a predetermined scale and the identification of flags, assignment of demerits, recordation of comments and recommendations during the evaluation as particular attributes or areas are perceived by the technician conducting the evaluations. It would further be advantageous to provide a system and method of evaluating an article that provides reports in a variety of formats listing and allowing comparisons by category, attribute, component, element or other format.

It would further be advantageous to provide a system and method of evaluating an article having any one or more of these or other advantageous features.

SUMMARY OF THE INVENTION

The present invention relates to a system for evaluating the craftsmanship of an article as perceived and includes a list of components to be evaluated, a list of attributes by which the components are to be evaluated, and a report providing a quantitative score of each component according to each attribute. The attributes include visual attributes, tactile attributes, functional attributes, and psychological attributes.

The present invention also relates to a method for evaluating the craftsmanship of an article having multiple components or assemblies and includes evaluating visual attributes of at least one component or assembly, evaluating tactile attributes of at least one component or assembly, evaluating functional attributes of at least one component or assembly, and evaluating psychological attributes of at least one component or assembly.

BRIEF DESCRIPTION OF THE DRAWINGS

FIG. 6 is a table representing the attribute evaluations for a component including rating, demerits, cause, comments and recommendations according to an exemplary embodiment.

FIG. 7 is a table representing the attribute evaluations for a component including rating, demerits, cause, comments and recommendations according to an exemplary embodiment.

FIG. 8 is a table representing the summary of attribute evaluation results for components according to zones within an article according to an exemplary embodiment.

FIG. 9 is a table representing the summary and average of attribute evaluation results for components according to zones within an article according to an exemplary embodiment.

FIG. 10 is a table representing the article and component evaluation results in a database adapted for searching and sorting by a user according to an exemplary embodiment.

FIG. 11 is a table representing the article and component evaluation results in a comparison format including comments for multiple articles according to an exemplary embodiment.

FIG. 14 is a table of craftsmanship attributes according to an exemplary embodiment. As shown the table identifies attributes that are arranged in three categories (sensorial, functional and psychological); other attributes may be selected if determined to be useful in the perception and evaluation of craftsmanship of a particular type of article. According to any preferred embodiment, the attributes will be selected and arranged to facilitate an essentially objective measurement and reporting (e.g. as may readily allow comparison of article of like type).

DETAILED DESCRIPTION OF THE INVENTION

An exemplary embodiment of the present invention is a system and method of evaluating the craftsmanship of an article of manufacture. Craftsmanship can be defined as the initial sensory perception of quality. (Quality may be defined in a variety of ways, such as a product having a high level of craftsmanship is one that is perceived like an expensive, high quality product, and indeed is a high quality product.) Craftsmanship in an article of manufacture is affected by, among other factors, the design of the article, the materials of construction, and the control of execution in the manufacture and assembly (as well as other steps) of the article (and each component or assembly comprising the article). According to any preferred embodiment, the system and method will provide for the use of one or a set of worksheets or checklists generating a "grade" (quantitative measure) based on the observations recorded during the evaluation. Although described in relation to a motor vehicle, the system of any embodiment could be used for any article of manufacture in which craftsmanship is a characteristic.

Figure 1:
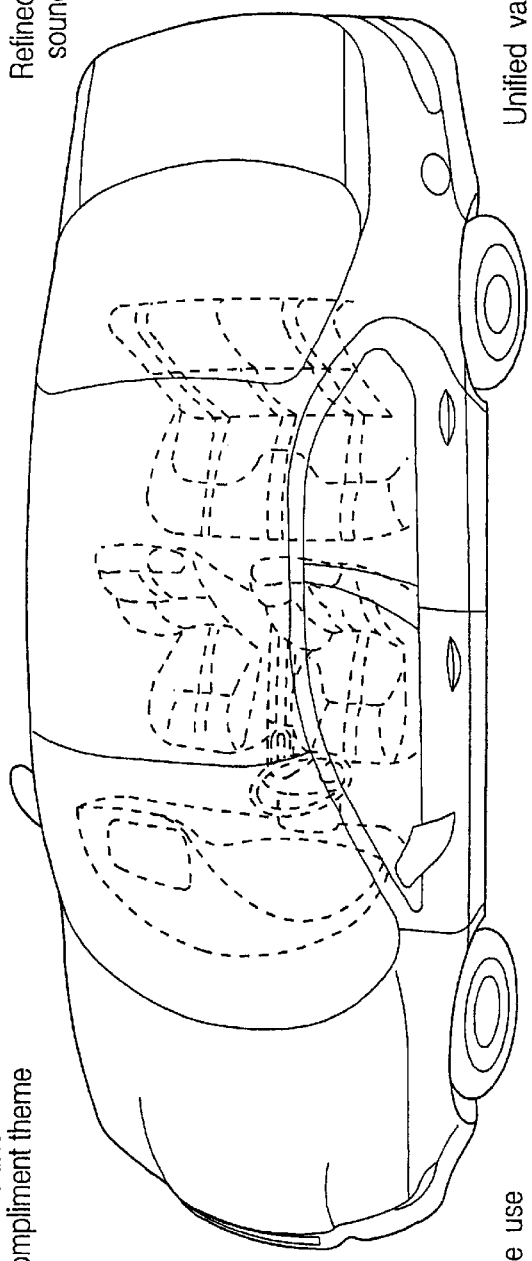
FIG. 1 is a perspective view of an article and a system for evaluating the craftsmanship of an article according to an exemplary embodiment.
Figure 2:
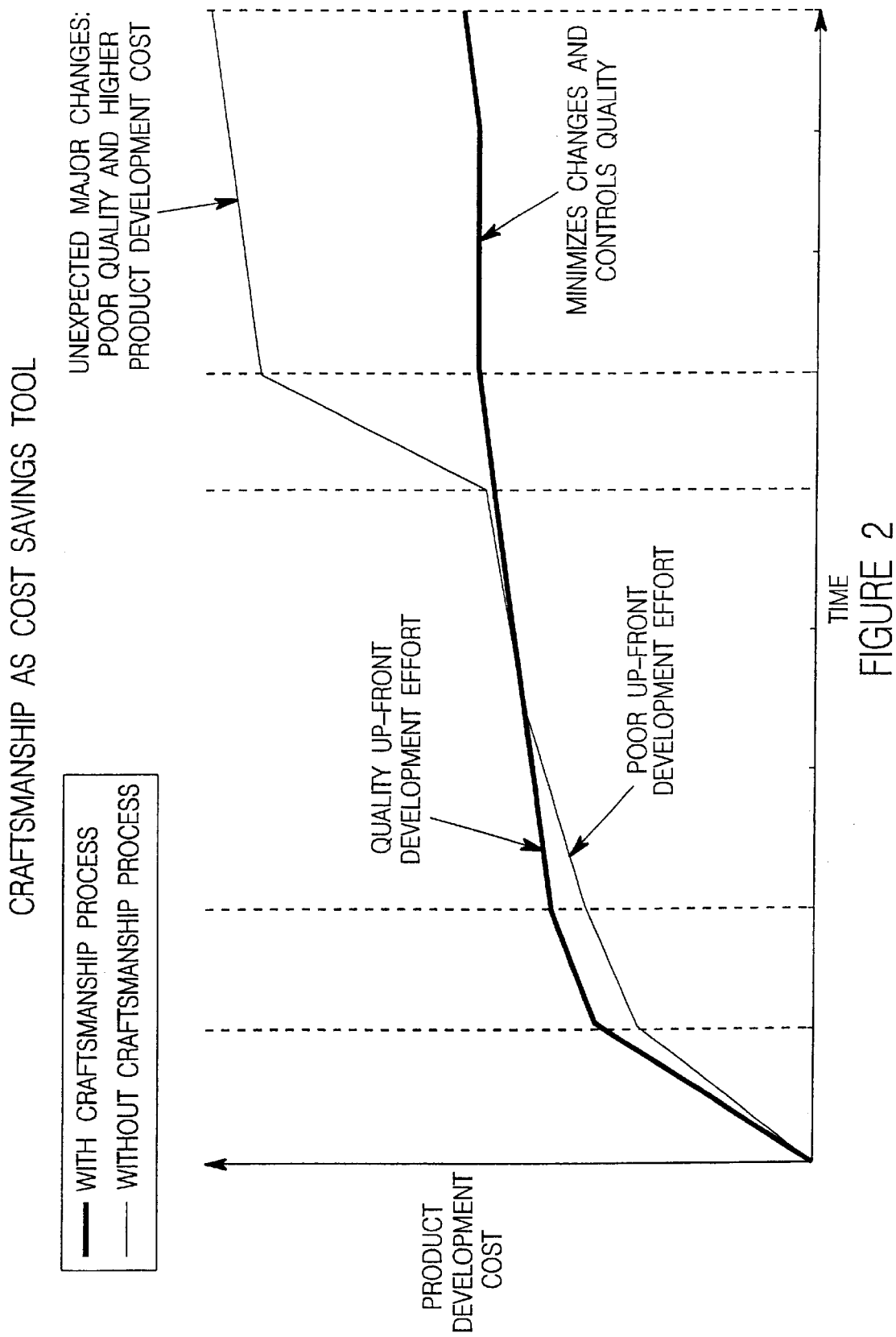
FIG. 2 is a graphical representation of the system for evaluating the craftsmanship of an article as a cost savings tool by demonstrating overall reduction in cost realized when applying the system during the initial product development phase according to an exemplary embodiment.

FIG. 1 illustrates generally an underlying concept of an exemplary embodiment—to provide a system of objectively evaluating and "grading" the quality of craftsmanship of an article of manufacture in such a way as to facilitate objective comparison of the article and/or between two or more articles. The system according to a particularly preferred embodiment allows designers, manufacturers or potential customers, for example, to evaluate and also to compare against standards and/or against other articles in an effort to determine which is the better article. (According to a particularly preferred embodiment, the article of manufacture is a motor vehicle such as an automobile including an interior and components.)

According to any preferred embodiments, the system and method involves applying a detailed checklist or worksheet to facilitate the evaluation the craftsmanship or quality of a variety of components or assemblies of an article of manufacture. The system for evaluating the craftsmanship of an article of manufacture as perceived by a trained technician (or other person) selection of a list of components or assemblies to be evaluated, selection of a list of attributes by which the components or assemblies are to be evaluated, conducting the evaluation through the perception and recording of information (e.g. observations) pertaining to the component or assembly with reference to the attributes selected, providing a report including a quantitative score or "rating" of the attribute for each component or assembly. According to any preferred embodiment, the system and method allows the evaluation of the attributes of the article by perceiving the attribute and recording an observation relating to the attribute of at least one component or assembly. The system and method also may include providing reports in a wide variety of formats allowing evaluation and/or comparison of results of a single article of manufacture or a variety of articles of manufacture of identical or similar or related types. The format of example reports according to particularly preferred embodiments of the system and method are shown in FIGS. 4–11. The system and method also provide a variety of lists, worksheets and other user interfaces as shown in the exemplary embodiments of FIGS. 5, 6, 7, 11, and 14, and Tables 1–14; these lists or user interfaces are intended to direct a trained technician or other person conducting an evaluation to perceive the attribute and record or grade the attribute based on observations according to (or at least approximating) a generally objective scale.

FIG. 1 shows a "context" and an overall summary (or user interface) that would be presented in the context of an evaluation of an article shown as an automobile (having an interior shown partially and exterior). An advantage of the system is that it allows information to be presented in several ways (e.g. through a wide variety of reports and/or user interfaces). A primary component of the system is the use of a user interface (such as a checklist, worksheet or report) employing a numeric or alpha-numeric grading system and applying that checklist to evaluate the craftsmanship of several components of an article of manufacture. The "grades" generated by the evaluations are compiled and recorded on the checklist (for various designated components, categories, attributes, features, etc.) and may then be summarized for presentation. FIG. 1 shows a very general arrangement in which that information may be presented (e.g. using such phrases as "appropriate use of technology," and "refined mechanism sound and feel") to describe the positive grades (or in appropriate circumstance the negative grades) that an example article shown as a vehicle may receive through evaluation according to a particularly preferred embodiment of the system and method.

According to a preferred embodiment, the system is configured to evaluate and measure craftsmanship "universally"—by generally objective attributes and using categories common to articles of manufacture of the type or class; in the fields of design and manufacturing, measurement may yield benchmarks helpful in creating a "culture" of craftsmanship. Every feature of an article of manufacture is a combination of the feature's form and function. By providing an overall grade based upon the evaluation of individual features using attributes and categories having commonality, the system is intended to provide an accurate and reliable evaluation of the article's attributes, as well as overall form and functionality. The attributes that evidence "better" craftsmanship may be identified, evaluated and used for overall (and/or categorical) comparison of articles. The level of detail or number or scope or arrangement and/or categorization of attributes operates at least partially to simulate an objective (e.g. reproducible and reliable) measure of craftsmanship of an article. According to any preferred embodiment, trained technicians or other persons will be better able to achieve an improved level of "objectivity" in their evaluation of the craftsmanship of articles by using reliable, reproducible and specific attributes for perception, evaluation and reporting in a consistent manner. According to any preferred embodiment, the system and method will eliminate variation in the types and arrangements of attributes used in an evaluation to enhance a quantitative or objective report on craftsmanship.

An exemplary embodiment of the system is intended to provide a useful and reliable grade of craftsmanship despite inherent differences in the vocabulary used by trained technicians or other persons who conduct the evaluation of craftsmanship (e.g. irrespective of the use particular terminology of description). According to any preferred embodiments of the system, it will not be necessary (although it may be convenient) that technicians use substantially similar terminology when describing elements. The technicians evaluating craftsmanship may be trained to use consistent terminology and a consistent and objective grading scale when evaluating an article as they perceive it. Thought it is acknowledged that according to alternative embodiments of the system and method, two or more technicians may perceive or describe an identical effect or defect (e.g. attribute) using different terminology (word). The use of a numeric or alpha-numeric grading scale (as well as the selection of categories and attributes) is intended to lessen the effect of such potentially inconsistent use of terminology. The system is designed (and the technicians may be trained) such that technicians will assign substantially the same "grade" to a particular level of quality for an attribute or element within a category, regardless of the words that may also describe the effects evidencing such quality.

Figure 3B:
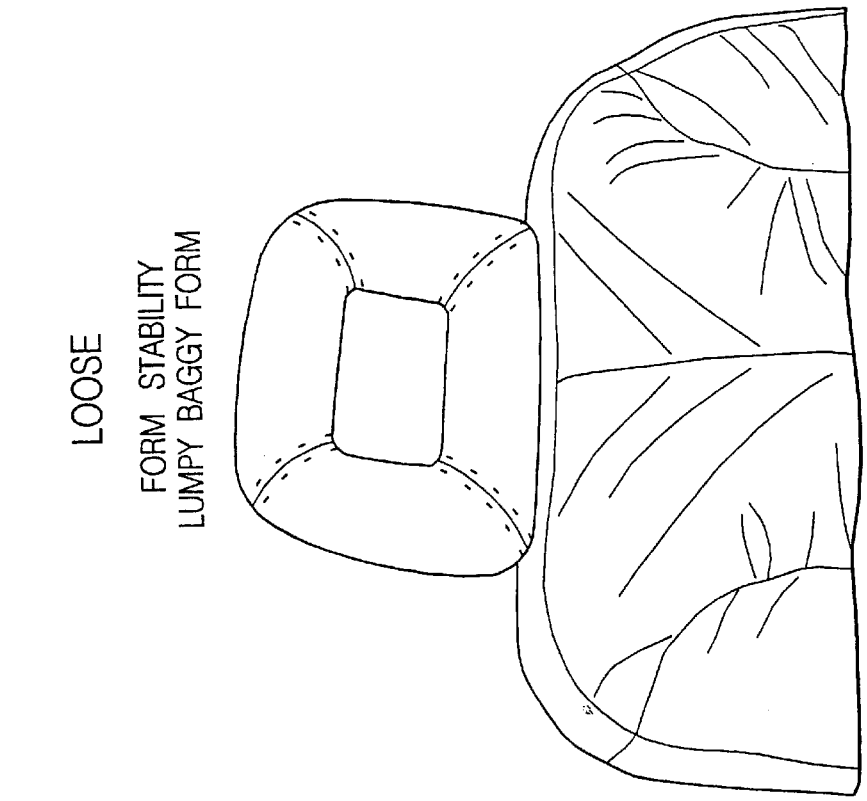
FIG. 3B is a perspective view of a component having another set of attributes relating to a discontinuity of form and shape according to an exemplary embodiment.
Figure 3A:
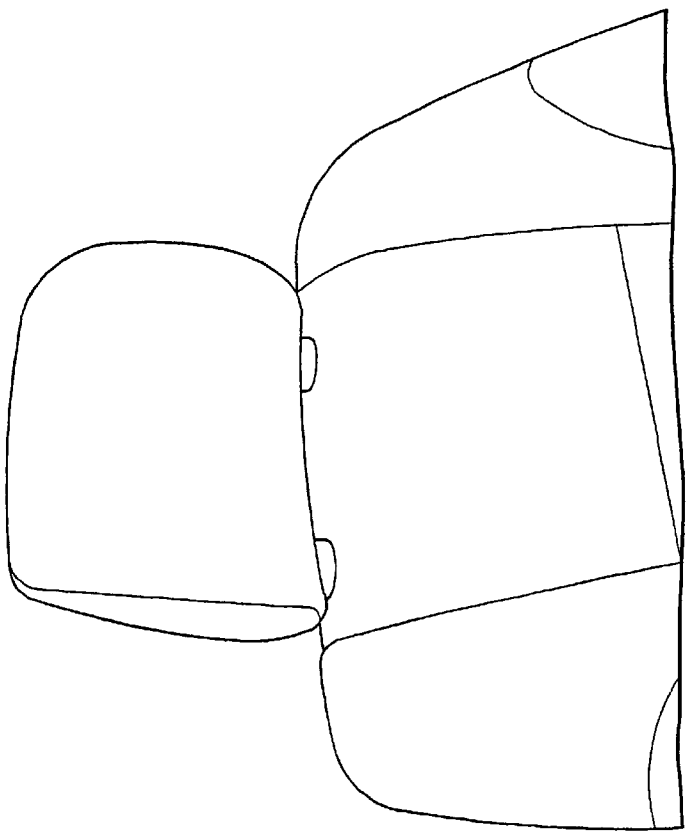
FIG. 3A is a perspective view of a component having one set of attributes relating to continuity of form and shape according to an exemplary embodiment.

FIGS. 3A and 3B illustrate examples of variation ("high" and "marginal") quality of craftsmanship as well as exemplary or intended vocabulary used to describe such craftsmanship. For example, when evaluating seat-backs and upholstery in automobiles, a higher quality of craftsmanship is described in FIG. 3A as the effects of "taut" or "carefully held form" and "matches back." On the other hand, a lower quality of craftsmanship is described in FIG. 3B as "loose" or having "lumpy baggy form." (These descriptions and the terms used are assigned particular meanings to technicians trained in the system according to a particularly preferred embodiment for evaluating automotive interiors.) FIGS. 3A and 3B also demonstrate the important design relationship involving form and shape. FIG. 3A demonstrates a component design having quality craftsmanship form and shape characteristics with a taut and uniform construction (shown schematically as a seat and headrest) having smooth and uniform shape and form consistently applied over the entire component. FIG. 3B demonstrates a component design having less desirable quality and craftsmanship and inconsistent application of form and shape characteristics. The seat back portion is shown with a loose and baggy shape and form, and the headrest is shown having a tight shape and form. According to any preferred embodiment, the system is intended to be applied in such a way that two different technicians could evaluate the same article (in an exemplary embodiment shown in FIGS. 3A and 3B, a seatback of an automobile) and would be expected to provide substantially the same "grades" or quantitative rating if not also substantially the same comments in effect (regardless of terminology used).

Figure 4:
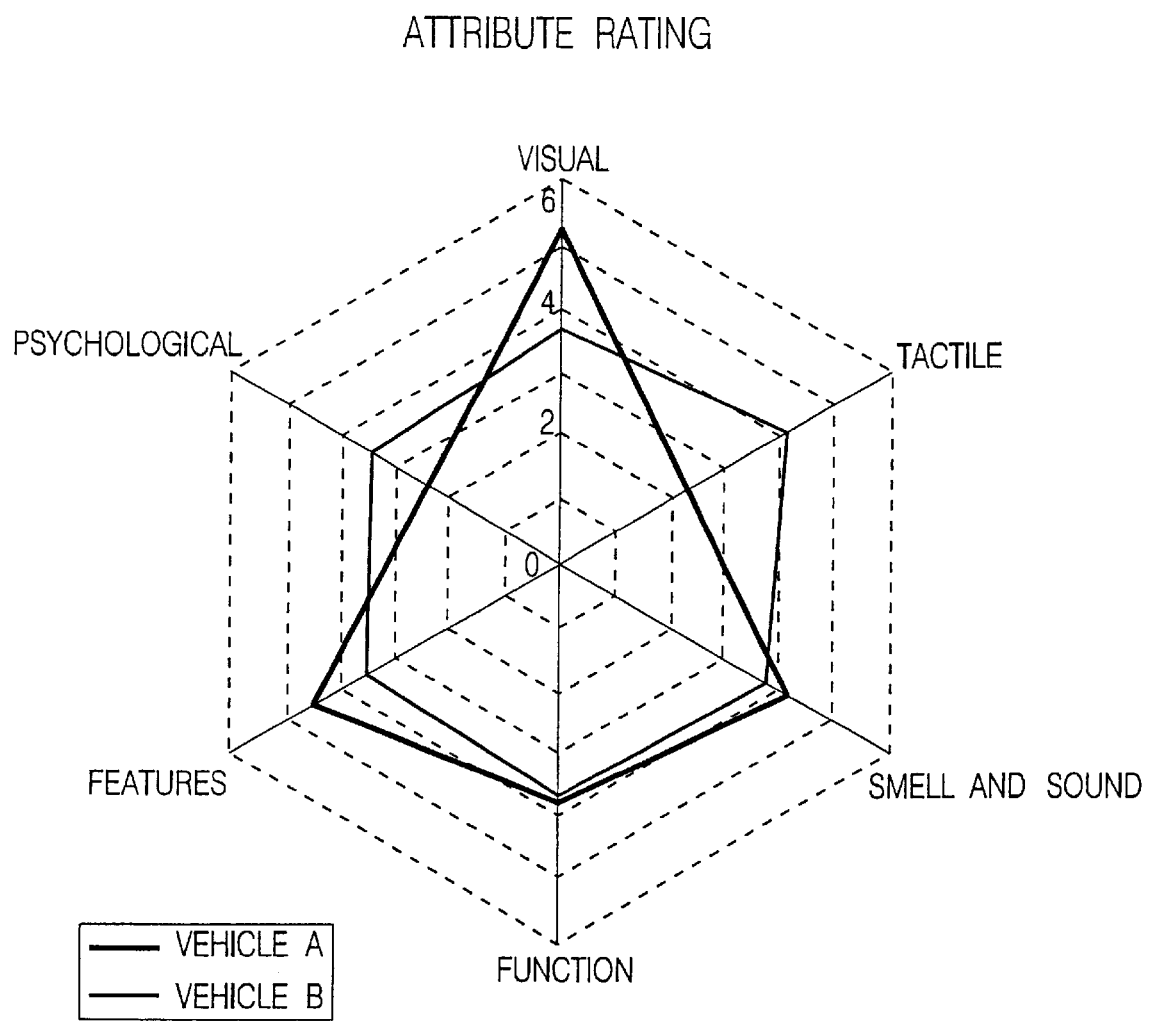
FIG. 4 is a graphical representation of a comparison of attribute ratings for one or more articles according to an exemplary embodiment.

A preferred embodiment of the system provides for a "holistic" approach to evaluating the craftsmanship of an article (as well as a categorical and quantitative measurement/assessment). In particular, the system allows compilation and integration of the evaluation of the article's individual elements into an overall grade designed to represent overall quality. Although the system provides an overall "grade", and the "grade" is intended to be based on objective criteria, that "grade" does not tell the entire "story" of quality or craftsmanship. The overall grade generally reflects the sum of the grades of attribute categories or areas, which is further comprised of narrower fields and elements. The system provides for the evaluation of an article's individual elements at a suitable level of detail so that the sum of the element grades essentially and fairly comprises the overall "grade" while individual "grades" fairly allow an objective assessment of an element or category (e.g. section or area of the article). Although two articles could receive the same overall grade, they may not be of the same "quality". FIG. 4 illustrates that two articles (e.g. vehicle A and vehicle B) could receive the same overall average grade (e.g. 3.75 of 6.0 maximum) while maintaining widely varying attribute ratings. The highest level of craftsmanship is represented by a high overall grade comprised of relatively similar element, field, and attribute grades. That is, the highest quality articles are solid in all phases—they have no low quality elements or components. According to any preferred embodiment, it should be recognized that "balance" of all grades (or quantitative scores or ratings) for any elements or components or assemblies may be desirable (e.g. vehicle B demonstrates better "balance" than vehicle A as shown in FIG. 4).

According to any preferred embodiments, the system directs technicians to evaluate articles of manufacture by analyzing component parts of the article. In particular, the system divides an article of manufacture into its components parts. Every component is evaluated based on certain attributes, which are comprised of features, which further contain elements. The system directs technicians to evaluate the individual elements. The system can present "grades" (at quantitative ratings) through a wide variety of reports having a wide variety of forms or format and presented in a wide variety of media (documents or computer-based or other information display technology). In several preferred embodiments the evaluation of component parts is presented as part of larger areas of the article. That is, the component parts can be grouped into larger areas, which are then further presented as part of yet a larger category of the article. The system thus allows the evaluation of the craftsmanship of an article to be presented in several ways—from very detailed reports presenting data from each element to more general reports providing overall grades of categories or areas.

Figure 5:
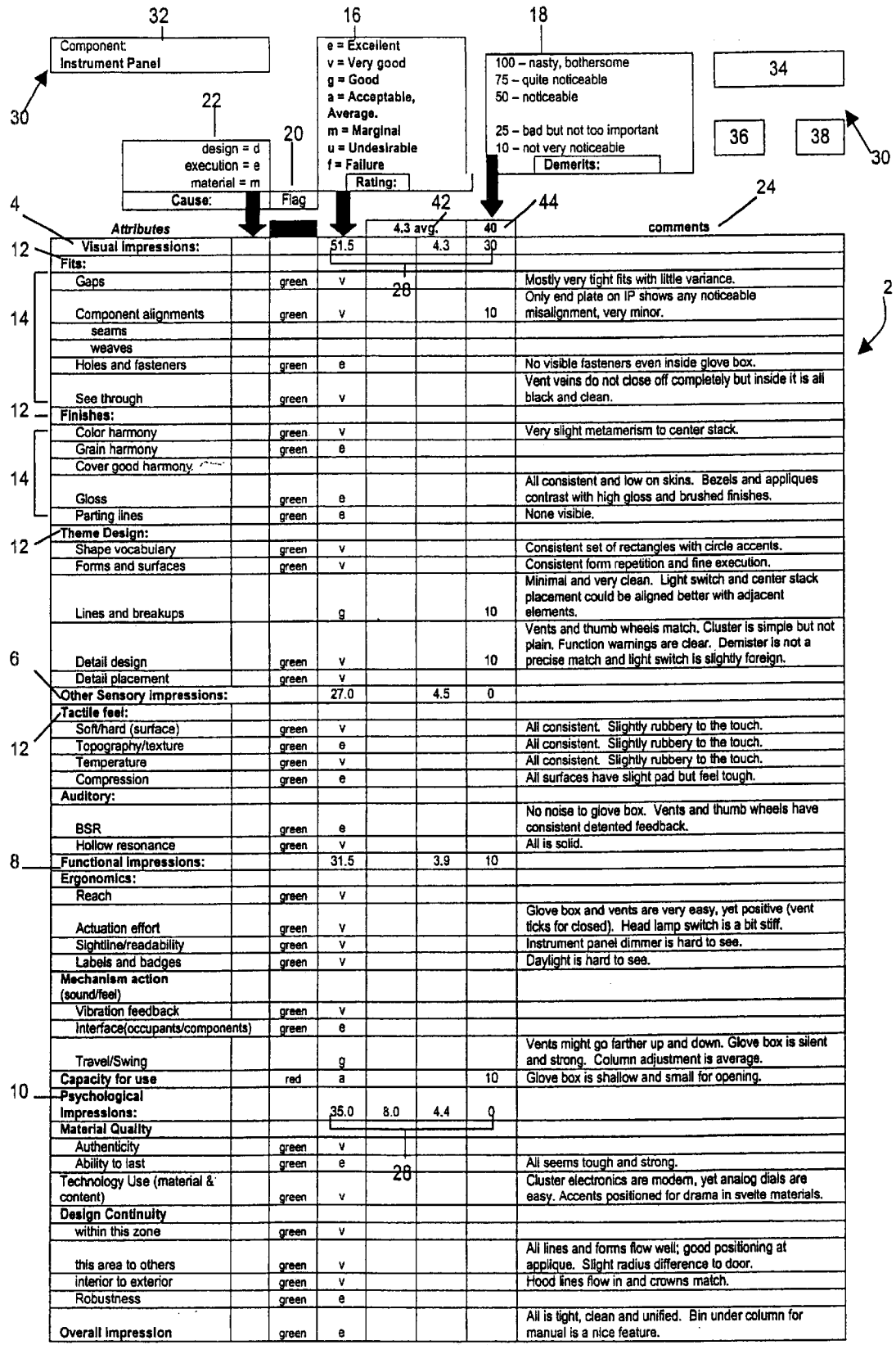
FIG. 5 is a table representing the attribute evaluations for a component including rating, demerits, cause and comments according to an exemplary embodiment.
Figure 6:
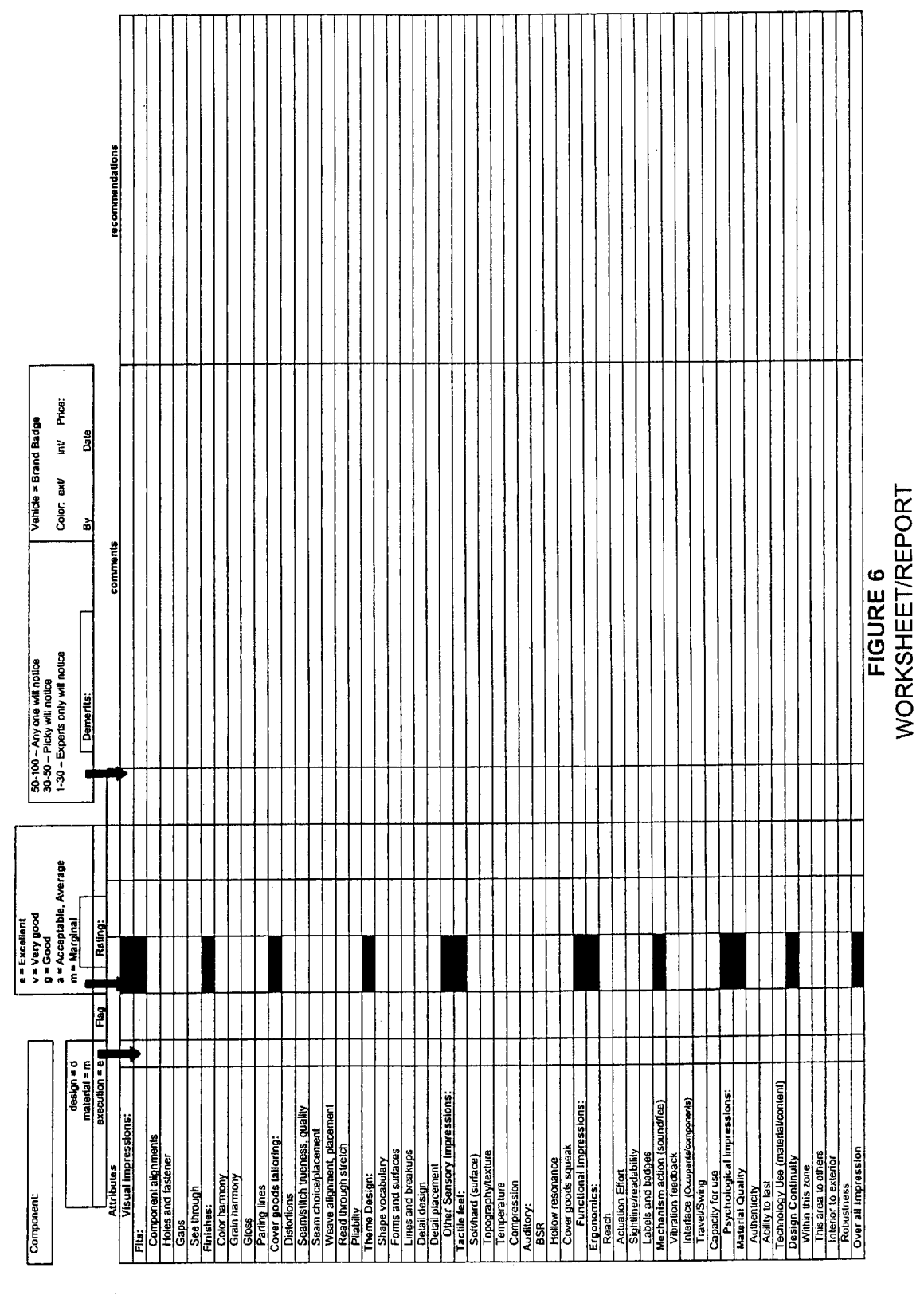

FIG. 5 shows a form (e.g. user interface or worksheet) shown as a checklist 2 used in the system according to a particularly preferred embodiment. Checklist 2 includes a numeric and/or alpha-numeric system for grading the craftsmanship of individual components of the motor vehicle (which may be pre-selected). Each selected or designated component (e.g. instrument panel, entry, trim, etc.) of the motor vehicle is rated in four attribute fields: Visual Impressions 4, Other Sensory Impressions 6, Functional Impressions 8, and Psychological Impressions 10. The attributes are divided into fields 12 which include major groupings of related elements within each attribute field. For example, the Visual Impressions attribute section (as shown in FIG. 5) includes the fields: Fits, Finishes and Theme Design. Each field 12 is further divided into elements 14. The Fits field includes the elements: Gaps, Component Alignments, and Holes and Fasteners. It should be acknowledged that for various articles or types of articles, any of a variety of alternative attributes, fields, or elements could be designated to be included in the checklist. An alternative embodiment of the system providing different fields and elements is shown in FIG. 6.

Tables 1–14 provide inspection, evaluation and design considerations corresponding to the attributes for use by a technician in evaluating (e.g. perceiving and recording, etc.) or otherwise in assessing, measuring or grading the craftsmanship of a components relating to a motor vehicle. These considerations constitute only a list of example relevant considerations used for motor vehicles. It should be acknowledged that according to alternative embodiment the list may be expanded or modified as necessary or appropriate for evaluation of other types of motor vehicles, or be more widely adapted or reconfigured as necessary or suitable for craftsmanship evaluations relating to other articles of manufacture.

TABLE 1

I. Visual Impressions

Fit - This is a review of the overall fit of components and systems.

Component alignments - Do components line up to each otherwhere they should?
Holes and fasteners Are the holes and fasteners hidden, or at least covered?
Gaps - Has a gap strategy been established? Are the gaps tight and consistent?
See through - Do paint or glossy areas show between components?
Finish - This is a review of the finish continuity of components.

Color harmony - Do the colors match and are the number of intended colors kept to. a minimum?
Grain harmony - Do the grains match and are the number of intended grains kept to a minimum?
Cover goods harmony - Do the cover goods colors match and are the number kept to a minimum?
Gloss - Is the gloss consistent throughout the vehicle? Is there low or no gloss?
Parting lines - Are parting lines identified in the current design? Are they in non-visible areas?
Cover Goods - Tailoring: This is a review of all fabric and sewing attributes.

Distortions - Are bunching, deformation, crushed pile, nap grin through, wrinkle, or bagging distortions?
Seam/stitch trueness/quality - Are seams tight, straight and true? Are there sew holes? Are seams or stitches loose?
Seam choice/placement - Are seams all the same and appropriately-placed for durability and good design?
Weave alignment/placement - Selvage aligned? Logically placed? Well chosen?
Read through/Stretch - Are any components showing through the cover?
Pliability - Does the material appropriately bend and compress to the touch?
Theme Design: This is a review of the overall theme and harmony of the design.

Shape vocabulary - Is there continuity to the shapes used? Logic to the placement?
Forms and surfaces - Is there continuity to the forms and contours used? Good surface execution?
Lines and breakups - Do lines and breakups of parts seem well thought out and aligned?
Detail design - Are details crisp? Do details show thought and a purpose?
Detail placement - Are details placed in logical locations and close to their intended purpose?

TABLE 2

II. Functional Impressions: This is a review of the functional usability of the product in the vehicle.

Ergonomics: This is a review of the general ergonomic application of human factors.

Reach - Have ergonomic specifications for the component/system features been identified and followed?
Actuation effort - Are actuation efforts on switches and levers consistent?
Sightline/readability - Are user interfaces and sightlines readable and appropriately placed?
Labels and badges - Are features labeled consistently and intuitively? Do they match brand image?
Mechanism action: This is a review of the perception of the mechanisms in the vehicle.

Vibration feedback - Are mechanisms and attachment methods conducive to a smooth, solid feel?
Interface (occupants/components) - Is the interface intuitive and pleasant to use? Is there any occupant or component interference?
Travel/Swing - Does the component travel and swing far enough? Appropriately?
Capacity for use - Will the feature hold mugs, glasses, coins, maps, etc? Do items. fall out? Appropriately sized?

TABLE 3

III. Other Sensory Impressions: This is a review of non-visual sensory perceptions.

Tactile feel: This is a review of how surfaces and parts feel to the touch.

Soft/hard (surface) - Are soft surfaces placed in areas of contact and hard surfaces where they will wear most?
Topography/texture - Are the textures consistent to the hand?
Temperature - Are the materials giving consistent cool/warm cues? Real metals are cool, wood and leather are warm.
Compression - Are cushions firm, but soft in contact areas? Are they consistent throughout vehicle?
Auditory: This is a review of the sounds of the vehicle.

BSR - Are buzzes, squeaks and rattles present from loose or sloppy mechanisms?
Hollow resonance - Does the end item have a hollow resonance when attached to sheet steel?
Cover good squeak - When moving components is there any noise?

TABLE 4

IV. Psychological Impressions: This is a review of the psychological perception of the interior.

Material Quality - This is a review of the materials used in the vehicle.

Authenticity - Does the material appear to be real wood, metal, or leather?
Ability to last - Have durability targets been established?
Technology use (material & content) - Does the technology used seem outdated, cheap, high tech, etc?
Design Continuity: This is a review of the continuity within the vehicle.

Within this zone - is there harmony within the shapes, colors, textures, forms, lines, details etc.?
This area to others - Is there continuity between this component and other components in the vehicle?
Interior to exterior - Are alignment issues seen through the windows or doors to the sheet metal?
Robustness - Has it been designed to handle wear? Is it solid and strong? Does it seem flimsy?

V. Overall Impression: This is a summary of the entire Craftsmanship review.

TABLE 5

| Attributes | Design Tips |
|---|---|
| Visual Impressions for Fit: | |
| Component Alignment | 1. Minimize the number of components coming together in one area (combine components). 2. Consider all components in adjacent areas and plan alignments that are unified. 3. Use consistent styles of radii and intersections to unify the details. 4. Guard against multiple component combinations that can cause variation in final assembly fits. 5. Insure secure fastening strategy to avoid possible loose, sagging, distorted, or misaligned parts. 6. Where variation of fits is probable use overhang, radii, and corner strategies that will obscure the viewer's reference point and minimize the impact of misalignments. 7. For doors lids and components that park, use self-centering stops to align and locate the "at rest" position. |
| Holes & Fastenings | The best designs show no evidence of fasteners. 1. Insure a strong enough fastening to prevent loose or flexing parts. 2. Design all possible fasteners to work from the back side (clips and hidden hardware). 3. Plan assemblies that cover fasteners by an assembly order or with solid finishers. 4. Place fasteners below viewing angle (underside of forms), with extreme angles of access holes beneath. 5 . When a fastener must be seen: (a) Place it where the detail is logically integrated to other design elements; (b) Recess and paint screw heads; (c) Use caps only when color and parting lines of caps are clean and correct. |

TABLE 5-continued

| Attributes | Design Tips |
| --- | --- |
| Gaps | The best designs show no edges to the customer, have minimal consistent and parallel joints, use a consistent radii strategy minimizing joint inconsistency, and insure component assemblies are tight and positioned for consistent gaps. 1. Never allow the customer to see through a gap (use step flanges and angle intersections to sight lines) 2. Plan for coverage in all swing conditions. 3. For doors lids and components that park, use self centering stops to align and locate the "at rest" position. |
| See Through | Any place the customer can see through or past a component, minimize or finish what is visible in that area. 1. Insure no odd colored parts, wires, fasteners, labels or materials can be seen. 2. Mat black surfaces inside whenever possible (gloss reflects and highlights the back). 3. Consider minimizing or hiding secondary mechanical elements such as seams, parting lines and fasteners. 4. Plan for gaskets and gimps (mat black materials or unified colors). 5. Insure carpets and other finished surfaces extend far enough into visible areas. 6. Plan for finishes in second surface areas that continue the level of the first surfaces. |

TABLE 6

| Attributes | Design Tips |
| --- | --- |
| Visual impressions for Finish: | |
| Color Harmony | Planning for good color requires careful design of form, material selection and coordination of all components. 1. All components in the theme that is a continuation of form and texture should match in color. 2. Never use disparate materials as continuous form and texture. 3. Never use too many elements that are 'close' in color texture and finish (they will appear as a mistake). 4. Gloss and texture will effect color perception. 5. Plan as many details to the same design formula for quality of color (e.g. chrome accents against black bezels etc.). 6. Be aware of how many colors are actually present. |
| Grain Harmony | Different materials carry grain differently. 1. Beware of calendared cover goods with molded components. 2. Plan on different textures. 3. How many different parts, tools, tool shops and texture houses are used. Reduce the number and reduce the opportunity for error. |
| Gloss | |
| Parting Lines | Design for their placement. 1. Always show them on your design studies. 2. Place them on tangencies paralleling edges carefully. 3. Good computer aided design takes less time to get good tool surface and allows time for tweaking tools for good parting lines. Deliver good computer aided design early. |

TABLE 7

| Attributes | Design Tips |
| --- | --- |
| Visual Impressions of Cover Goods Tailoring: | |
| Distortions | These attributes are generally self-evident for evaluation. |
| Seam/Stitch Trueness, quality | These attributes are generally self-evident for evaluation. |
| Seam Choice/Placement | These attributes are generally self-evident for evaluation. |
| Weave Alignment and Placement | These attributes are generally self-evident for evaluation. |
| Read Through/Stretch | These attributes are generally self-evident for evaluation. |
| Pliability | These attributes are generally self-evident for evaluation. |

TABLE 8

| Attributes | Design Tips |
| --- | --- |
| Visual Impression for Theme Design: | |
| Shape Vocabulary | 1. Consistency to a formula with progressive variations is usually most satisfying (e.g. rectangles with similar lead ins). 2. The construction of the composition should have an underlying order that can be shown to have a logical progression (i.e. circular switches in organic lines). 3. Avoid too many different vocabularies and random placements. |
| Form and Surfaces | 1. Forms should be derived from a common palate. 2. Sections should have an identifiable relationship if not repeated directly. 3. Surface development should reflect the finish (no tangents visible on leather grains). 4. Components should work with each other to produce a unified whole, flowing through and having similar treatments of edges and placements. |
| Lines and Breakups | 1. Graphic composition should be organized and not disrupted by unplanned elements such as material seams, fasteners, or manufacturing distortions. 2. Any element that creates a line should be considered in the design. |
| Detail Design | 1. The formula for composing a detail using shape, form, line, materials, color, texture and function that can be identified and repeated in another detail. 2. Repetition of formulas with mild variation is always desirable to continuity. |
| Detail Placement | The Emphasis on a detail can depend on placement. Caution on emphasizing the unimportant or obscuring what should be emphasized by improper placement. Watch for alignments and patterns for placement of detail that 1. Eliminate extra components or complexities. 2. Align logically with other elements and details. 3. Reflect secondary patterns of organization that are not immediately evident 4. Repeat rhythmic themes seen elsewhere. |

TABLE 9

| Attributes | Design Tips |
| --- | --- |
| Functional Impressions for Ergonomics: | |
| Reach | 1. Are the Buttons and levers easy to reach? 2. Too close to others? 3. Logically placed? |
| Actuation Effort | All components should have the same feel, travel, or motion required to actuate mechanisms. 1. Is it easy? 2. Consistent? 3. Smooth? 4. Like others in the area or vehicle? |
| Sightline/Readability | 1. Are all items requiring viewing clearly seen? 2. Are they lit? 3. Can you see into bins? 4. Can you find levers and switches readily and logically? |
| Labels and Badges | 1. Same graphic design scheme? 2. Same fonts, sizes, etching, embossing, back lighting and materials? 3. Are labels placed well? 4. Are labels straight? 4. A guideline for the vehicle should unify these elements. |

TABLE 10

| Attributes | Design Tips |
| --- | --- |
| Functional Impressions for Mechanism Action (Sound/Feel): | |
| Vibration Feedback | 1. Pushing switches and opening doors should not produce any chatter, raspy or rattling experience. 2. All should be consistent. 3. Check the strategy for all these types of components and make them consistent. |
| Interface (Occupants/ Components) | No component should interfere with another or with occupants causing loss of function damage or discomfort. |
| Travel/Swing | 1. Does it go far enough? 2. Open wide enough? 3. Park in a good location? |

TABLE 10-continued

| Attributes | Design Tips |
| --- | --- |
| Capacity for Use | 1. All bins should be large enough to hold items commonly placed therein and should be designed to keep items in place, possibly hidden. 2. Handles should be large enough for fingers. 3. Does anything in the design seem not quite functional for the perceived purpose? |

TABLE 11

| Attributes | Design Tips |
| --- | --- |
| Sensory Impressions for Tactile Feel: | |
| Soft/Hard (Surface) | 1. How do the surface materials feel when stroked or contacted with the finger tips? 2. All materials that are visually similar should feel similar. |
| Topography/Texture | 1. Is the physical texture the same? 2. Caution about disparate processes like calendared roll goods vs. injected parts receiving the same texture specified. 3. The most difficult or "set" process will have to drive the mastering system and subsequent processes for best results. |
| Temperature | 1. Materials should reflect body heat appropriately. 2. Wood, chrome and leather have specific feedback. 3. Caution on the use of vinyl that is too cold in combination with warm leather. 4. Plastic imitations of wood and chrome. |
| Compression | 1. Compression In the first 3 mm as well as 20 mm and 100 mm? 2. Components should have similar feels with similar looks and be compressible where the body contacts regularly and prolonged. (elbows and knees at rest are often ignored.) |

TABLE 12

| Attributes | Design Tips |
| --- | --- |
| Sensory Impressions for Auditory: | |
| Buzzes, Squeaks and Rattles | Small increments in switches, latches and hinges as well as large assembly issues should be forecast. |
| Hollow Resonance | 1. Caution on thin wall stock polycarbonate and ABS. 2. Lack of fasteners, ribs, deadener and even glossy pack-sides can contribute as well as configuration of space beneath component and adjacent materials. 3. Some padded sheet maerials will translate this phenomena even with compression ability. 4. Test samples with fingernails for evidence. |
| Cover Goods Squeak | 1. Vinyl, leather and some fabrics will sound cheap when moving parts or people on them. 2. Test samples. |

TABLE 13

| Attributes | Design Tips |
| --- | --- |
| Psychological Impressions for Material Quality: | |
| Authenticity | 1. Wood components never have parting lines, are seldom large and radically contoured and have grain change at edges. 2. Leather is seldom smooth and shiny stitches are different in texture and color. 3. Chromed metal feels cold and has no parting lines. 4. Leather wrapped parts show no surface tangencies, parting lines or sharp edges. 5. Always design to the nuance of the material that is being imitated. |
| Ability to Last | 1. Provide for wear surfaces like scuff ribs. 2. Fasten down well in areas of body contact. 3. Do not over stretch or thin material out where action will cause wear. 4. Unpainted screws gather moisture in recesses and rust. 5. A recess will prevent the edge of badges or components from getting snagged or peeled. 6. Complete closure inhibits disassembly. |

TABLE 13-continued

| Attributes | Design Tips |
| --- | --- |
| Technology Use (Material & Content) | 1. Exposed fasteners, cut holes in plastic showing wall thickness and incomplete attachment schemes are all indicators of a low technology process. 2. Smooth mechanisms, sound assemblies and closed finishes with few seams and no sign of fasteners are higher technology. 3. All materials matching and no extra gimps, fillers and gaskets are exemplary of sophisticated design and manufacture. |

TABLE 14

| Attributes | Design Tips |
| --- | --- |
| Psychological Attributes for Design Continuity: | |
| Within This Zone | 1. Do all the elements match each other? 2. Any foreign forms, materials or details that should not be emphasized? |
| This Area to Others | 1. Is there a recognizable design formula in this area that relates to the whole? 2. Can adjustments be made that connect it to the whole via integration? 3. Detail unification? 4. Function conveyance? 5. Review amounts of color, texture materials, form development and small details for similarities to the whole. |
| Interior to Exterior | 1. Check the relationship of the interface to exterior components (i.e. doors trims). 2. Fret lines and exterior forms should have logical relationships when seen with or against components. (i.e. instrument panel to hood, door beltline, sill plates to rockers, pillars to seals etc.) |
| Robustness | 1. Is it strong, durable and designed for enjoyable use? 2. No flimsy loose fitting parts or seams where they will get wear or tear. 3. Good visual schemes to prevent misalignment. 4. Thick enough cover goods to prevent erosion. |

Checklist 2 further includes a rating scale 16. The number of divisions within the rating scale may vary according to the article or nature of the evaluation or the level of detail desired. The rating scale can be numeric or alpha-numeric. A numeric quantity can be attributed to each rating in the rating scale. A technician (e.g. person conducting the evaluation) will assign a rating to each element during the evaluation, preferably based on the objective scale known and applied by all technicians. In the embodiment as shown in FIG. 5, rating scale 16 and numeric values are defined in Table 15 as follows:

TABLE 15

| Rating | Abbreviation | Numeric Value |
| --- | --- | --- |
| Excellent | E | 5.0 |
| Very Good | V | 4.0 |
| Good | G | 3.5 |
| Acceptable (Average) | A | 3.0 |
| Marginal | M | 2.5 |
| Undesirable | U | 2.0 |
| Failure | F | 1.0 |

Although the use of the alpha-numeric (numerical and word) rating scale provides additional precision, the system may alternatively be employed through the use of a purely numeric grading scale. (The assignation of particular rating names or terms, abbreviations or numeric values is independent of the process employed in the system.) That is, any rating designations, names, abbreviations or numeric values could be used in the system, according to alternative embodiments.

Checklist 2 also includes a system in which demerits 18 are assigned to elements 14. Demerits 18 are intended to reflect the severity of defects or shortcomings of an element. According to a particularly preferred embodiment (shown in FIG. 5), demerits 18 are assigned values in generally in accordance with TABLE 16:

TABLE 16

| Demerit Value | Meaning |
| --- | --- |
| 100 | Nasty, Bothersome |
| 75 | Quite Noticeable |
| 50 | Noticeable |
| 25 | Bad but not Important |
| 10 | Not very Noticeable |

Demerit values are provided in a range of 10 to 100 and reflect the degree to which the defect is noticeable and by whom the defect is noticeable. For example, demerits values in the range of 1 to 30 could denote that the defect is noticeable only to an expert (e.g. a person with special skill or training in the field), demerits values in the range of 30 to 50 could denote that the defect is noticeable only to particular people (e.g. those who pay particularly close attention to detail), while demerits values in the range of 50 to 100 could denote defects noticeable to anybody with normal observation skills. According to alternative embodiments, other scales or numeric ranges may be used, or an explicit demerit assignment process may not be included and the rating given to a particular element may simply be downgraded to reflect presence of an effect that otherwise would call for the demerit.

Checklist 2 further includes a flag system 20. The purpose of the flag system is to alert the technician or user of the evaluation of a particularly strong or weak attribute. According to a particularly preferred embodiment, exceptional (e.g.

high quality) elements are denoted with green flags, while problematic (e.g. lower quality) elements receive red flags. For example, a red flag may signify that a particular element requires redesign, component or material changes, alternate assembly, etc. The number, color and meaning of the flags utilized within the system could be adjusted to suit the particular needs of the evaluator or user. (Alternative embodiments of the system may not include a flag system.)

Checklist 2 also includes a cause section 22 in which technicians may denote the cause of a particular defect that has been perceived. According to a preferred embodiment (shown in FIGS. 5–7), cause section 22 provides three categories or codes for designation of a likely or recognized cause of a particular defect: (1) design; (2) execution (e.g. control of execution); or (3) material. Other embodiments of the checklist may include an "architecture" code or may provide other cause sections having greater or fewer potential causes depending on the article being evaluated. (A cause section may be removed if not desired or useful for an evaluation.)

Checklist 2 of the present invention further includes a comments section 24 in which technicians may elaborate on the evaluation of particular elements. The individual technician has the discretion to include comments; however, it is important for the technician to try to use consistent terminology when including comments. That is, it is intended that technicians will use relatively consistent terminology when describing the quality of craftsmanship of a particular element of a particular component. For example, the "Reach" element of field "Ergonomics" was described as follows: "Glove box and vents are very easy yet positive (vent ticks for closed). Head lamp switch is a bit stiff." (Phrases such as "vents are very easy yet positive" and "lamp switch is a bit stiff" or other phrases used may have particular meaning to technicians or those who review the system (e.g. when reported that a vent is "very easy" it is intended that technicians using the system in a particular application share a generally common understanding of the term)).

Referring to FIG. 7, an alternative embodiment of checklist 2 includes a recommendations section 26 that provides guidance for future design and/or correction of existing defects. Recommendations are optional; however, it is intended that technicians use consistent terminology if they provide recommendations. For example, in the "Travel/Swing" element of the "Functional Impressions" field, the technician recommended: "Locate hinge point so swing is not in occupant zone/viscous damp for slow open." The use of such recommendation is intended to promote or facilitate future improvements and/or modifications in design, manufacture, assembly, and material choice.

According to a particularly preferred embodiment (as shown in FIG. 5), checklist 2 also includes a numeric summary 28 for each attribute field. Numeric summary 28 comprises a composite score, average element rating and demerit quantity for each attribute field. The composite score for each attribute field is calculated by summing the numeric values of the rating assigned to every element within the attribute field. The composite score is displayed adjacent to the number of elements rated within each attribute field. The average element rating is then calculated by dividing the composite score by the number of elements rated with the attribute field. The average element rating is simply the composite score divided by the number of elements rated within each attribute field. The demerit quantity for each attribute field is computed by summing the demerit values assigned to each element rated with the attribute field. The demerit quantity is further displayed on the checklist adjacent the composite score, number of elements rated, and average element rating. For example, "Psychological Impressions" attribute field 10 as shown in FIG. 5 received a composite score of 35.0 from the 8.0 elements rated, resulting in an average element rating of 4.4 and a demerit quantity of 0.

Evaluation checklist 2 further includes component summary data. In the embodiment illustrated in FIG. 5, the component summary data provides an efficient reference for investigating and comparing component evaluation results. One skilled in the art would appreciate that the numeric summary of each attribute field and component summary data could be calculated and displayed in a variety of forms to provide a user friendly media for conveying evaluation results.

According to a preferred embodiment of the system and method, the trained technician will use checklist 2 to evaluate every component of the article being inspected. Checklist 2 serves two functions. First, checklist 2 is a guide for the technician. That is, checklist 2 is thorough and comprehensive and "reminds" the technician of all areas of inspection (as a process map). Checklist 2 is preferably the same for all components of the article being inspected (although some elements may not be applicable to certain components). According to alternative embodiments, the form and content of the checklist (e.g. process map) may vary.

Checklist 2 also serves as a written report of the evaluation of a particular component. A technician will evaluate the craftsmanship of several components of a given article, and the evaluation of each component is presented on a separate checklist 2. Each checklist thus includes a header 30 showing:

1. An accurate description of the component being evaluated 32.
2. The motor vehicle make, model, color, and price 34.
3. The technician name 36.
4. The evaluation date 38.

Although the header 30 (shown in FIG. 5) provides certain basic information, according to alternative embodiments, the system may provide a header 30 presenting more or less information as necessary to carry out the desired function or communication of or within the evaluation.

Evaluation data from the individual components is compiled and summarized and presented as a report or user interface 40 (as shown in FIG. 8). According to a particularly preferred embodiment configured to present data from evaluation of a motor vehicle interior system, user interface 40 is configured to provide the component evaluations shown in TABLE 17:

TABLE 17

| | |
|---|---|
| 1. | Instrument Panel (IP) |
| 2. | Intersection IP-Door |
| 3. | Wheel and Shroud |
| 4. | Center Stack |
| 5. | Front Door |
| 6. | Center Console |
| 7. | First Row Seats |
| 8. | Entry |
| 9. | Overall Interior |
| 10. | Over Head System |
| 11. | Second Row Seats |
| 12. | Rear Doors |
| 13. | Upper Trim |

TABLE 17-continued

| | |
|---|---|
| 14. | Lower Trim |
| 15. | Package Tray |
| 16. | Cargo |
| 17. | Second Entry |
| 18. | Floor System |
| 19. | Third Row Seats |

User interface 40 includes a component data summary for each component evaluated. The component data summary includes the average score of each component element rated 42, average score by attribute field 46, demerit total 44 and a total composite score for the component 48.

User interface 40 further includes a summary of the entire evaluation performed on the article. The total interior summary 50 as shown in FIG. 7 includes an average element rating, average element rating by attribute field, evaluation demerit total, and evaluation composite score 52. The evaluation composite score is the possible score the motor vehicle could have received based on the rating scale employed in the evaluation.

User interface 40 as shown in FIG. 8 is further divided into Zone A (e.g. primary; those areas visible upon initial perception) and Zone B (e.g. secondary; those areas that do not attract the initial attention of an observer). According to any preferred embodiment, the zones are established based on how often an occupant will look at and interact with the components in the zone. All that is in direct line of sight and used during the driving experience, and contacted by a driver getting in and out is in Zone A. Zone B includes secondary interactions by driver and passengers. Alternative embodiments include a Zone C (e.g. those areas that may not attract the attention of an observer until extended familiarity with the article), which is utilized less often or has less attention paid to it, i.e., the floor. The individual zones of the user interface provide useful presentation of data for comparison of motor vehicle evaluations.

The user interface 40 includes a header 54. The header as shown in FIG. 7 includes a description of the article being evaluated 56, the technician's name 58, evaluation date 60, and the rating scale 62 employed. The description of the article comprises the make, model, year, color and price of the motor vehicle. The user interface header may be configured to include any useful information about the article or method utilized in the evaluation.

According to alternative embodiments, the user interface (s) presented by the system may be given other suitable configurations, such as a very general description of the quality of craftsmanship in "context" (as shown in FIG. 1). Rather than provide numerical grades for each component as was provided by user interface 40 of FIG. 7, the user interface of FIG. 1 provides a more general description of the quality of craftsmanship. The user interface as shown in FIG. 1 describes the craftsmanship of the automobile with phrases such as "consistent, non-visible parting lines compliment theme," and "clean forms and lines combined with proper reaches and tight fit and finish." A value of the system of the present invention is that it allows information to be presented in many ways. Detailed numeric grades and summary data—like that provided by user interface 40 (shown in FIG. 7)—can be provided if desired or useful. If, on the other hand, a very general description (as shown in FIG. 1) is desired, the system may be configured accordingly. Other embodiments of user interfaces are illustrated in FIGS. 9 and 10.

According to any preferred embodiment, the system allows persons to accurately and reliably compare the craftsmanship between two or more articles. Referring to FIG. 11, the system provides a vehicle-to-vehicle component comparison report 64. A vehicle-to-vehicle comparison allows a customer to compare vehicles based on overall quality of craftsmanship as well as comparisons among each component. Vehicle-to-vehicle report 64 shown in FIG. 11 identifies the component for comparison 66, the attribute evaluated, such as visual impressions 4, as well as the field and particular element's rating. Vehicle-to-vehicle report 64 shows the rating 68 each vehicle received for the particular element. In addition, vehicle-to-vehicle report 64 also provides the technician's comments 70 regarding the evaluation. A vehicle-to-vehicle report such as the one shown in FIG. 11 thus allows thorough and easy to understand comparison among vehicles.

Figure 12:
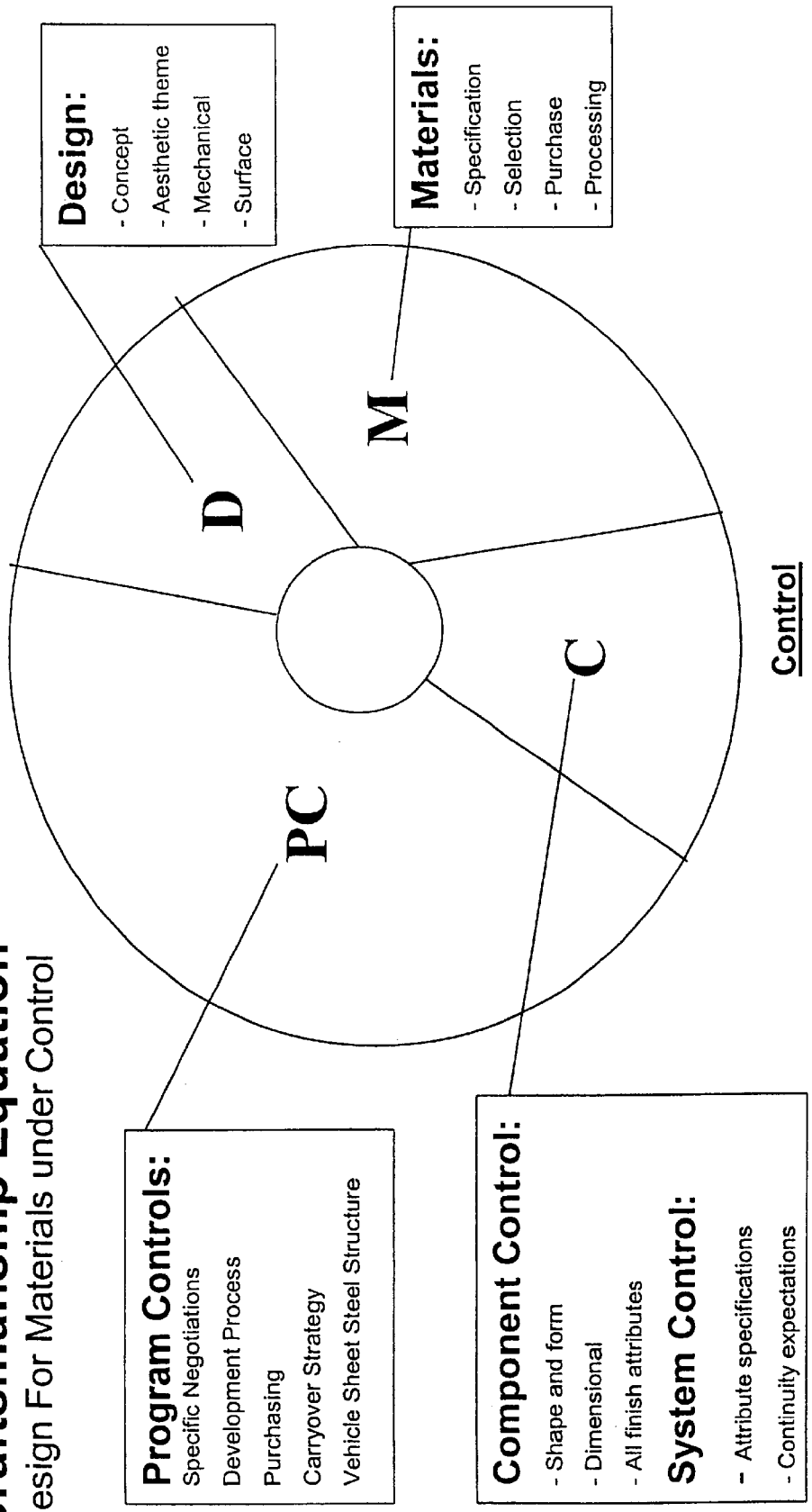
FIG. 12 is a graphical representation of a set of categories by which craftsmanship may be evaluated to identify and remedy deficiencies in the quality or craftsmanship of particular elements; for example a designer or design team may direct its attention to assessing whether quality and or craftsmanship was less than expected because of problems with the design of the article, the materials used in the assembly of the article, or control of execution in procurement or manufacturing, according to an exemplary embodiment.
Figure 13:
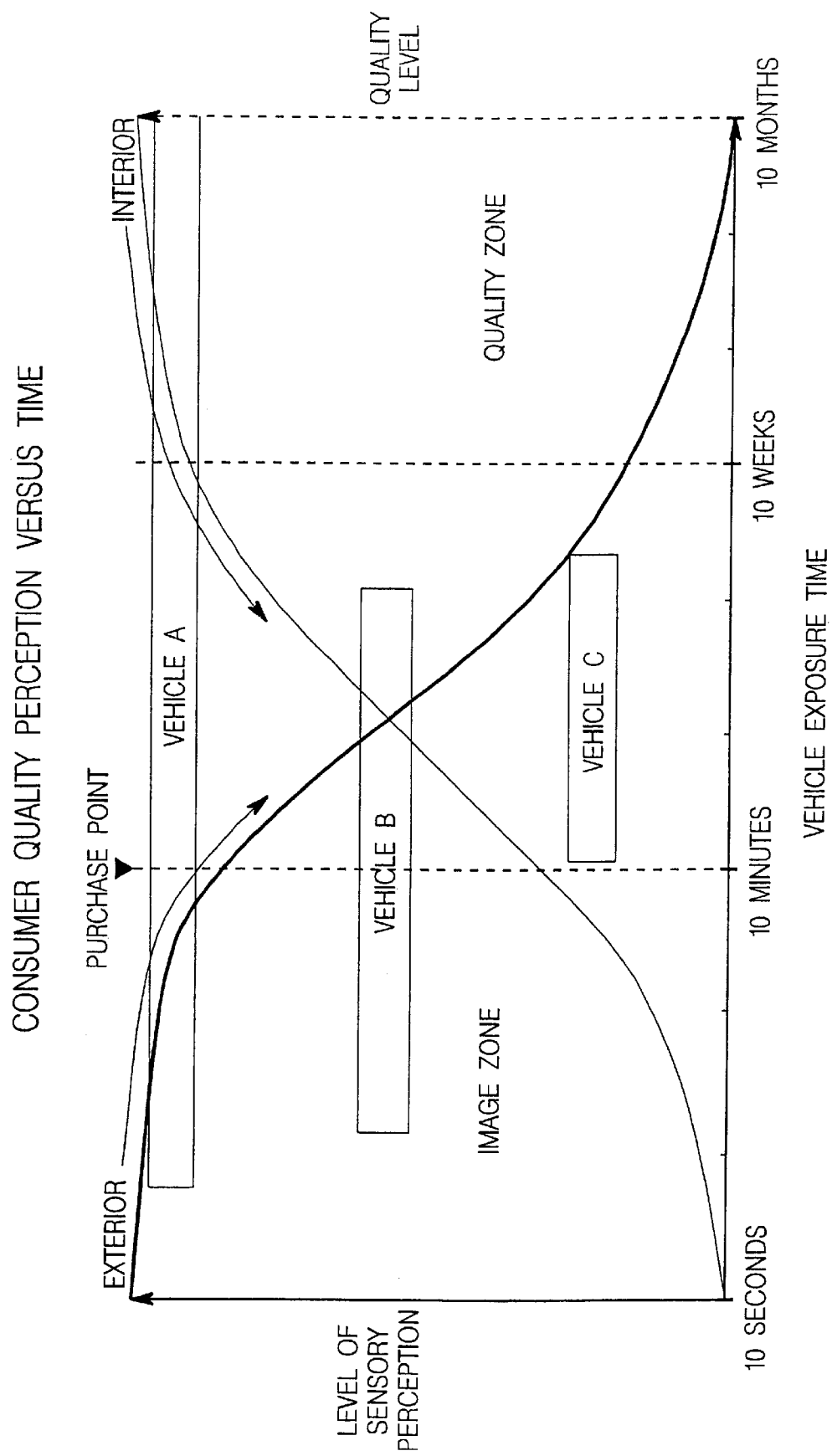
FIG. 13 is a graph of quality (including craftsmanship) as perceived versus time for an article according to an exemplary embodiment. As indicated it would commonly be expected that the "image" of the article would be perceived initially and immediately while the "quality" of the article would be perceived over time; it should also be noted that the exterior elements of the article are perceived more quickly than the interior elements of the article (e.g. some of which may only periodically be used).

FIG. 12 shows a craftsmanship "equation" or evaluation plan. Such an equation illustrates the different "components" of craftsmanship. The design, materials used, program, component and system controls are contribute to the quality of craftsmanship of an article of manufacture. FIG. 13 shows a graph of how the perception of quality changes over time. The image or perception of quality may dominate initially, but true quality shows through over time. FIG. 14 illustrates several attributes of quality. The craftsmanship of a article of manufacture is perceived many ways, i.e., through visual and other sensory impressions, through functional impressions, and through psychological impressions. FIG. 14 illustrates several more objective "factors" or elements that may underlie the otherwise subjective impressions.

The checklist, user interface and component comparison reports of a preferred embodiment could be displayed on any electronic, printed or other information-containing printed information. In an alternate embodiment, the checklist, user interface or component comparison report could be displayed on a computing device or information display. According to alternative embodiments, the system (including all checklists, worksheets, user interfaces and reports) could be implemented for use and displayed over any network, such as a local area network, wide area network intranet, the Internet or any other network or communication system.

It is understood that the elements, attributes, evaluation considerations and terminology of the system described in the preferred and other exemplary embodiments are illustrative only. Although only a few embodiments of the present inventions have been described in detail in this disclosure, those skilled in the art who review this disclosure will readily appreciate that many modifications are without materially departing from the novel teachings and advantages of the subject matter recited in the claims. For example, other scoring systems, ranges, notations, categories, terminology, attributes, evaluation considerations, reports and representations may be used without departing from the subject matter of the invention. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the scope of the present inventions as expressed in the appended claims.

What is claimed is:

1. A system for evaluating the craftsmanship of a vehicle as perceived comprising:
   a list of components of the vehicle to be evaluated;
   a list of attributes by which the components are to be evaluated;
   a report providing a quantitative score of each component according to each attribute;
   wherein the attributes include visual attributes, tactile attributes, functional attributes, and psychological attributes.

2. The system of claim 1 wherein the vehicle is a motor vehicle and the components include at least one of an instrument panel, an instrument panel-to-door intersection, a wheel and shroud, a center stack, a front door, a center console, a first row seat, a first entry area, a second entry area, an overall interior, an overhead system, a second row seat, a rear door, an upper trim component, a lower trim component, a package tray, and a cargo area.

3. The system of claim 1 wherein psychological attributes include at least one of theme design, robustness, perceived material quality, surprise and delight, authenticity, and annoyances.

4. The system of claim 1 wherein visual attributes include at least one of fit and alignment, lines and breakups, detail execution, color, grain, gloss, surface quality, and surface finish.

5. The system of claim 1 wherein tactile attributes include at least one of softness and hardness, topography and texture, vibration feedback, and temperature.

6. The system of claim 1 wherein functional attributes include at least one of ergonomics, mechanism action, capacity and functional use, and packaging and intrusion.

7. The system of claim 1 wherein attributes further comprise olfactory attributes.

8. The system of claim 1 wherein attributes further comprise auditory attributes.

9. The system of claim 1 wherein components are assemblies.

10. The system of claim 1 further comprising a checklist identifying a plurality of quantitative scores for the each component according to each attribute.

11. The system of claim 10 wherein the report is generated from the checklist and provided to a user to evaluate the quality and craftsmanship of the article.

12. The system of claim 11 wherein the report includes comments and recommendations.

13. The system of claim 1 wherein the components are categorized into one or more zones.

14. A method for evaluating the craftsmanship of a vehicle including a plurality of components or assemblies comprising the steps of:
   (a) evaluating visual attributes of at least one component or assembly of the vehicle;
   (b) evaluating tactile attributes of at least one component or assembly of the vehicle;
   (c) evaluating functional attributes of at least one component or assembly of the vehicle; and
   (d) evaluating psychological attributes of at least one component or assembly of the vehicle.

15. The method of claim 14 further comprising the step of evaluating olfactory attributes of at least one component or assembly.

16. The method of claim 14 further comprising the step of evaluating auditory attributes of at least one component or assembly.

17. The method of claim 14 further comprising the step of providing a rating of each of the components according to each of the attributes.

18. The method of claim 14 further comprising the step of providing an overall rating for the vehicle.

19. The method of claim 14 further comprising the step of assessing demerits for one or more defects.

20. The method of claim 14 further comprising the step of identifying deficient elements with a flag.

21. The method of claim 14 further comprising the step of identifying quality elements with a flag.

22. The method of claim 14 further comprising the step of providing a recommendation for design modification.

23. The method of claim 14 further comprising the step of identifying a probable cause for a defect.

24. The method of claim 14 further comprising the step of evaluating the tailoring of upholstered elements.

25. The method of claim 14 further comprising the step of evaluating fit of the components or assemblies.

26. The method of claim 14 further comprising the step of evaluating finish of the components or assemblies.

27. The method of claim 14 further comprising the step of evaluating theme design of at least one component or assembly.

28. The method of claim 27 wherein theme design comprises at least one of (i) forms and surfaces or (ii) lines and breakups or (iii) detail design or (iv) detail placement.

29. The method of claim 14 further comprising the step of evaluating material quality of at least one component or assembly.

30. The method of claim 14 further comprising the step of evaluating use of technology of at least one component or assembly.

31. The method of claim 14 further comprising the step of evaluating an overall impression of the vehicle.

32. The method of claim 14 further comprising the step of evaluating design continuity of at least one component or assembly.

33. The method of claim 32 wherein design continuity is evaluated within a zone of the vehicle.

34. The method of claim 32 wherein design continuity is evaluate within an area of the vehicle.

35. The method of claim 14 further comprising the step of evaluating the mechanical action of at least one component or assembly.

36. The method of claim 14 further comprising the step of evaluating finish of at least one component or assembly.

37. The method of claim 36 wherein the finish comprises at least one of (i) color harmony or (ii) grain harmony or (iii) gloss or (iv) parting lines.

38. The method of claim 14 further comprising the step of providing a report of the evaluation.

39. The method of claim 38 wherein the report is in the form of a graphical plot.

40. The method of claim 38 wherein the report is in the form of a printed list.

41. The method of claim 14 further comprising the step of using a checklist to perform the evaluation.

42. The method of claim 14 further comprising the step of using a computing device to record the evaluation.

43. The method of claim 14 further comprising the step of using a computing device to provide a report of the evaluation.

44. The method of claim 14 further comprising the step of providing a comparison of a first vehicle and a second vehicle.

45. The method of claim 14 wherein evaluating includes evaluating elements of the components or assemblies.

46. The method of claim 14 wherein the assemblies are components.

47. The method of claim 14 further comprising the step of selecting components present within the article to be evaluated.

48. The method of claim 14 wherein the vehicle is a motor vehicle and the assemblies are components of an interior system of the motor vehicle.

49. The method of claim 14 further comprising the step of categorizing the components into one or more zones.

50. The method of claim 49 wherein the zones include at least a first zone of primary components and a second zone of secondary components.

51. The method of claim 14 wherein the step of evaluating an attribute comprises perceiving the attribute and recording an observation relating to the attribute.

* * * * *